United States Patent
Lofland et al.

[11] Patent Number: 6,130,819
[45] Date of Patent: *Oct. 10, 2000

[54] FAN DUCT MODULE

[75] Inventors: Steve Lofland, Portland; Daryl James Nelson, Beaverton; Lloyd L. Pollard, II; James Stacker Webb, both of Portland; Scott L. Noble, Beaverton, all of Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/015,423

[22] Filed: Jan. 29, 1998

[51] Int. Cl.⁷ ...................................................... H05H 7/20
[52] U.S. Cl. .......................................... 361/695; 454/184
[58] Field of Search .................................. 62/263, 259.2; 361/687–697; 454/184

[56] References Cited

U.S. PATENT DOCUMENTS

| | | |
|---|---|---|
| 4,449,164 | 5/1984 | Carlson et al. ......................... 361/691 |
| 4,674,004 | 6/1987 | Smith et al. ............................. 361/694 |
| 5,428,503 | 6/1995 | Matsushima et al. .................... 361/695 |
| 5,566,377 | 10/1996 | Lee ......................................... 361/695 |
| 5,592,363 | 1/1997 | Atarashi et al. ........................ 361/689 |
| 5,691,883 | 11/1997 | Nelson .................................... 361/697 |
| 5,852,547 | 12/1998 | Kitlas et al. ............................. 361/695 |

*Primary Examiner*—Gregory Thompson
*Attorney, Agent, or Firm*—Gene Su

[57] ABSTRACT

A modular cooling apparatus for computer systems is disclosed. The apparatus includes an air-guiding duct, a fan coupling to the duct and a coupling apparatus for coupling the air-guiding duct and the fan to an electronics housing. The air-guiding duct has an input opening to the exterior of the electronics housing and guides ambient outside air to the input of the fan. Then the fan directs this outside air to the inside of the electronics housing. The electronic housing can be formed between a base module and the computer system circuit board or between the air-guiding duct, fan and a retention module. Furthermore, outside air is delivered in a substantially perpendicular direction relative to the plane of the computer system circuit board within the electronics housing.

10 Claims, 4 Drawing Sheets

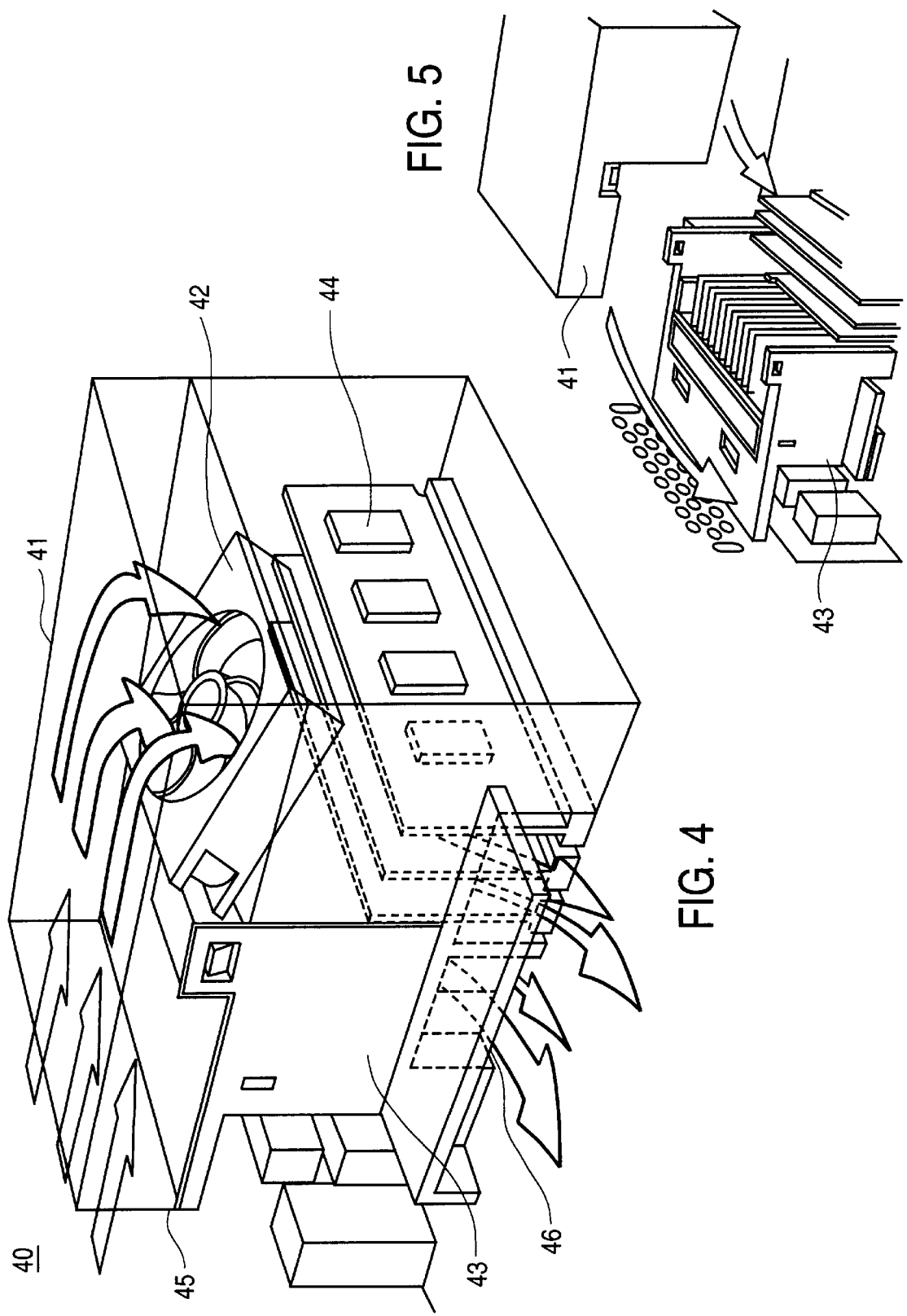

FAN DUCT MODULE

FIELD OF THE INVENTION

The present invention relates to an apparatus for cooling components within an electronics or a computer system enclosure. More specifically, the invention relates to an apparatus for cooling the core logic components of a computer system that minimizes cost and acoustic noise while maximizing the transfer of heat out of the enclosure. The improved cooling within the apparatus allows more flexibility in the design of the chassis design.

BACKGROUND OF THE INVENTION

Integrated circuits (ICs) are typically housed within a plastic or ceramic package. The packages have leads or surface pads that are soldered to a printed circuit board. The circuit board and package are often located within an enclosed computer chassis that contains other circuitry associated with the computer system such as peripherals, memory cards, video cards, power supplies, etc. The computer chassis typically contains fans that remove the heat generated by the IC and other system components.

It is desirable to have a high rate of heat transfer from the IC package in order to maintain the junction temperatures of the IC within safe operating limits. Modern microprocessors typically employ millions of transistors in internal circuitry that require some type of cooling mechanism, otherwise, excessive junction temperatures may affect the performance of the circuit and cause permanent degradation of the device. Further, in order for computer system manufacturers to remain profitable while facing the precipitous price erosion of computer systems, the manufacturers need to analyze and attempt to reduce the pricing of each computer system component. Hence, having a standardized, efficient, reliable and cost effective heat removal methods has become critical in the design of computer system enclosures. One prior art system utilizing an exhaust fan and some air ducts for cooling in a computer system enclosure is shown in FIGS. 1A, 1B and 1C (Nelson in U.S. Pat. No. 5,691,883, issued on Nov. 25, 1997).

FIG. 1A illustrates a top view of the prior art system. Enclosure 10 comprises a variety of components including a power supply 17, microprocessor 14, peripherals 24 and cards 16. Cards 16 may comprise any of a number of components, such as, for example, memory cards, modem cards, video cards, daughter boards, etc.. Peripherals 24 may include a floppy or hard disk driver or a number of other peripheral devices commonly known in the art.

Enclosure 10 is divided primarily into three sections. These include card slot and Peripheral compartment 25, power supply compartment 11, and air duct 13. As illustrated, compartment 25 contains peripherals 24 and cards 16. Compartment 11 contains power supply 17 and the cooling system fan 12. Air duct 13 houses the computer system processor 14.

The cooling fan 12 of the present invention resides in power supply compartment 11. fan 12 pulls air into enclosure 10 by creating a low pressure zone within the power supply compartment 11. Air duct 13 provides an air flow path from opening 26, at the exterior of enclosure 10, to an inlet opening 29 of compartment 11. The air duct is configured to direct cool air from the exterior of enclosure 10 across processor 14. By passing cool, unheated air over processor 14, a maximum achievable heat transfer is established across the processor. As the air flow passes over processor 14, it is heated. The heated air then passes along air duct 13 into compartment 11 through opening 29. In order to provide cooling to compartment 25, an air flow is established by providing openings 20 and 21 within air duct walls 18 and 19, respectively. (See FIGS. 1B and 1C.)

Although the cooling method and system of FIG. 1 is well established, some problems still exist. First, the enclosure with the previously described air duct, the fan, and all the openings can only operate with certain computer board designs. In other words, since components such as the power supply, various add-on cards, etc. can only reside in particular compartments of the enclosure, users' abilities to upgrade their computer boards and reuse the enclosure are severely hampered. Secondly, the cooling mechanism seems to focus more on the processor and not the rest of the system. As a result, other compartments of the enclosure will not receive cool, ambient air directly from the exterior of the enclosure, but will instead receive heated air after the air has already passed over the processor. Thus, cooling to other parts of the computer system may be ineffective, and more heat sinks are likely required to compensate for this shortcoming. Undoubtedly, these additional heat sinks will increase the cost of manufacturing computer systems. Lastly, the prior art describes a cooling mechanism which is built into the computer chassis. Because of the extra complexity in including the cooling system in the chassis's structure, implementing the invention described in FIG. 1A is certainly more costly than building the cooling and structural components separately and then assembling them together.

Therefore, an apparatus and method is needed to solve the aforementioned problems associated with using an one fan cooling system which is part of a computer system enclosure.

SUMMARY OF THE INVENTION

An improved apparatus and method for cooling the components located within a computer system enclosure is disclosed. In one embodiment, an air-guiding duct coupled with a fan is coupled to a base module. This base module further covers the computer system circuit board and forms an electronic housing. In accordance to the present invention, the air-guiding duct and fan force cool exterior air in a substantially perpendicular direction relative to the plane of the computer system circuit board and core logic components within said electronics housing. Hence, the present invention provides a cost effective, modular cooling apparatus and method that delivers unheated air to core logic components on the mentioned computer system circuit board. Additionally, cooling of the core logic components (processor, chipset, memory and graphics) in the present invention is de-coupled from many of the chassis design constraints that currently results in poor cooling of these core logic components, such as front bezel venting and cabling within the enclosure. The present invention also eliminates the need for expensive cooling solutions such as fan heat sinks or large passive heat sinks on the core logic components in typical chassis with improper venting and thermal design.

BRIEF DESCRIPTION OF THE DRAWINGS

The present invention is illustrated by way of example and is not limited by the figures of the accompanying drawings, in which like references indicate similar elements, and in which:

FIG. 4 illustrates the front view of another embodiment with arrows indicating the air flow through the enclosure.

FIG. 5 illustrates the modularity of the present invention with arrows indicating how the separate modules can be assembled.

DETAILED DESCRIPTION

An apparatus and method for cooling the components located within a computer system enclosure is described. In the following description, numerous specific details are set forth such as material types, dimensions, etc., in order to provide a thorough understanding of the present invention. However, it will be apparent to one of ordinary skill in the art that the invention may be practiced without these specific details. In other instances, well known elements have not been shown in particular detail in order to avoid unnecessarily obscuring the present invention.

Figure 1A:
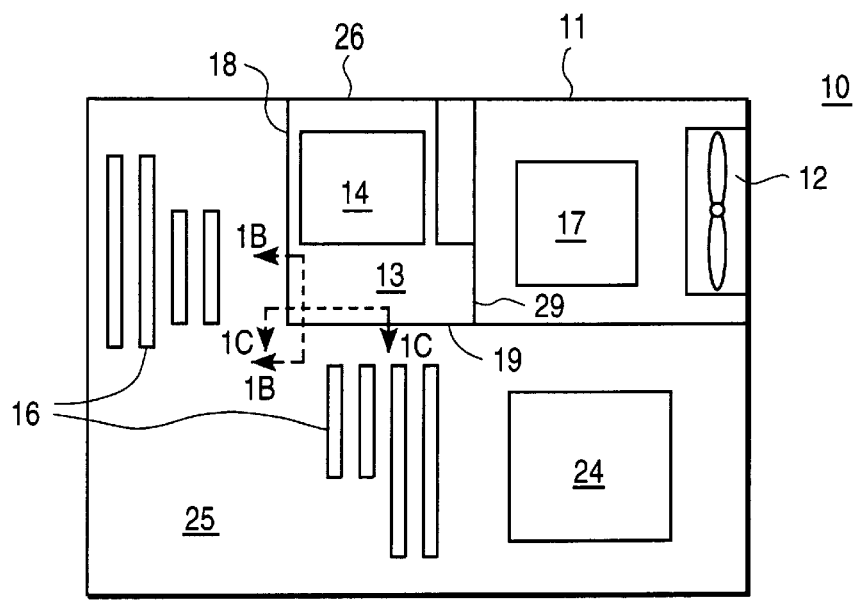
FIG. 1A illustrates a top view of a prior art computer system enclosure.
Figure 1B:
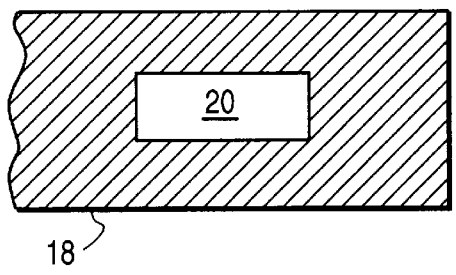
FIG. 1B illustrates a prior art cross-sectional view of wall 18 along line 1B—1B.
Figure 1C:
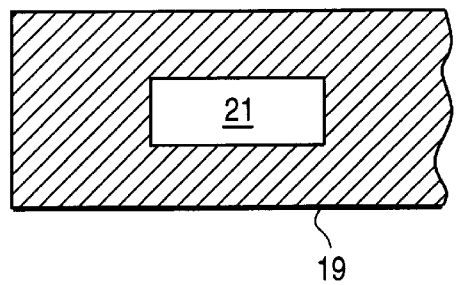
FIG. 1C illustrates a prior art cross-sectional view of wall 19 along line 1C—1C.
Figure 2:
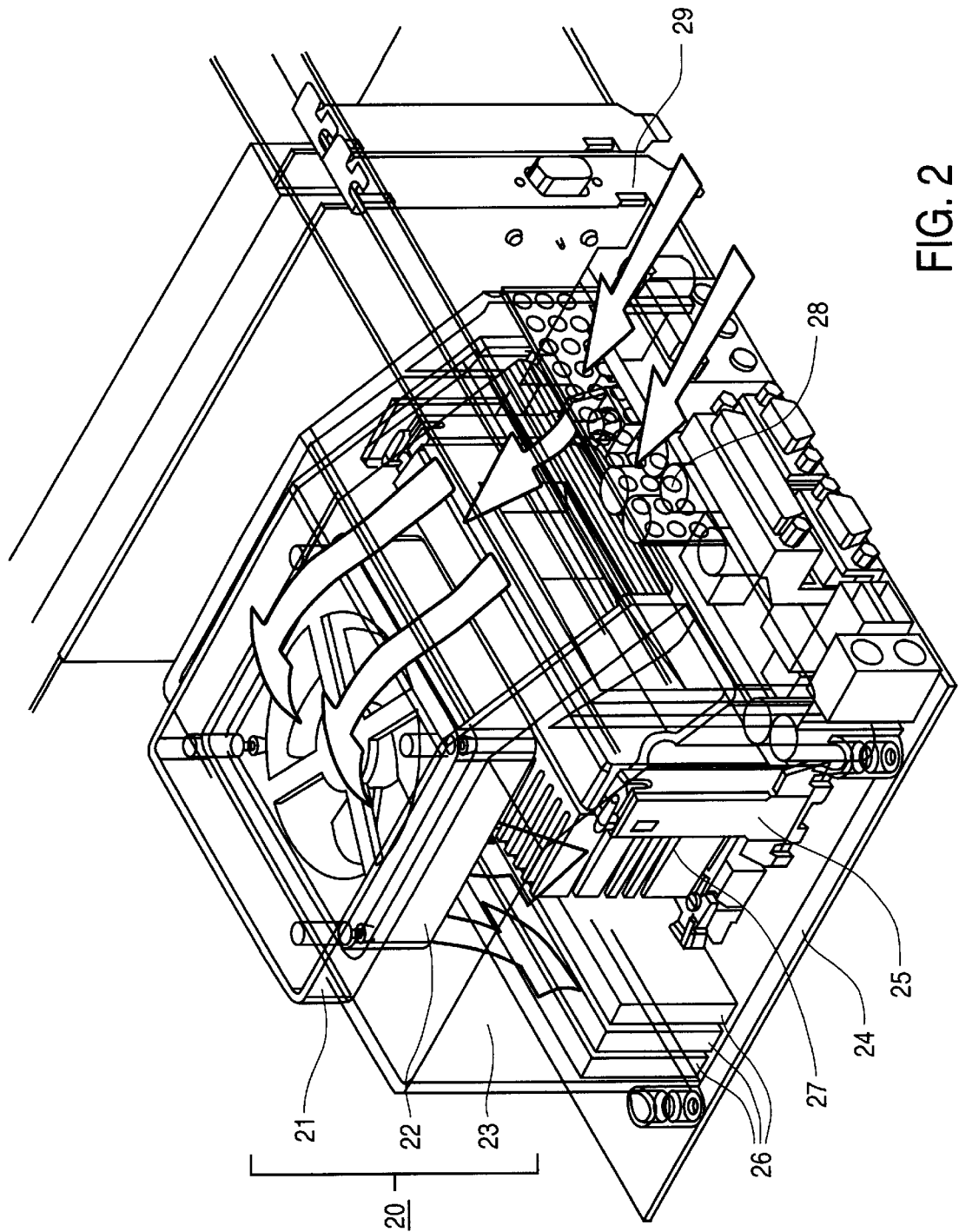
FIG. 2 illustrates the back view of one embodiment of the present invention with arrows indicating the air flow through the enclosure.

FIG. 2 illustrates the backside view of one embodiment of the present invention. The preferred embodiment of the present invention consists of an air-guiding duct 21, a fan 22 that is attached to the duct 21 and a base 23 which covers electronic components that are affixed on an electronic or a computer system board 24. System board 24 comprises a variety of components including, processor 25, memory 26, graphics component 29 and chipset located underneath heat sink 27. In addition, an enclosure 20 is formed by fastening base 23 to system board 24. Thus, components such as processor 25, memory 26 and the mentioned chipset are inside of enclosure 20.

As has been described previously, the cooling fan 22 of the present invention is attached to the air-guiding duct 21. Fan 22 pulls cool exterior air into enclosure 20 through air-guiding duct 21 and vent 28. More specifically, air external to enclosure 20 enters vent 28 and is channeled in an enclosed channel of air-guiding duct 22 so the cool air does not pass over any heat-generating components prior to reaching processor 25, memory 26, the chipset underneath heat sink 27 and graphics component 29. As a result, processor 25, memory 26, the chipset and graphics component 29 are able to receive cool exterior outside air, typically 15° to 20° lower than that found in prior art enclosures.

Figure 3:
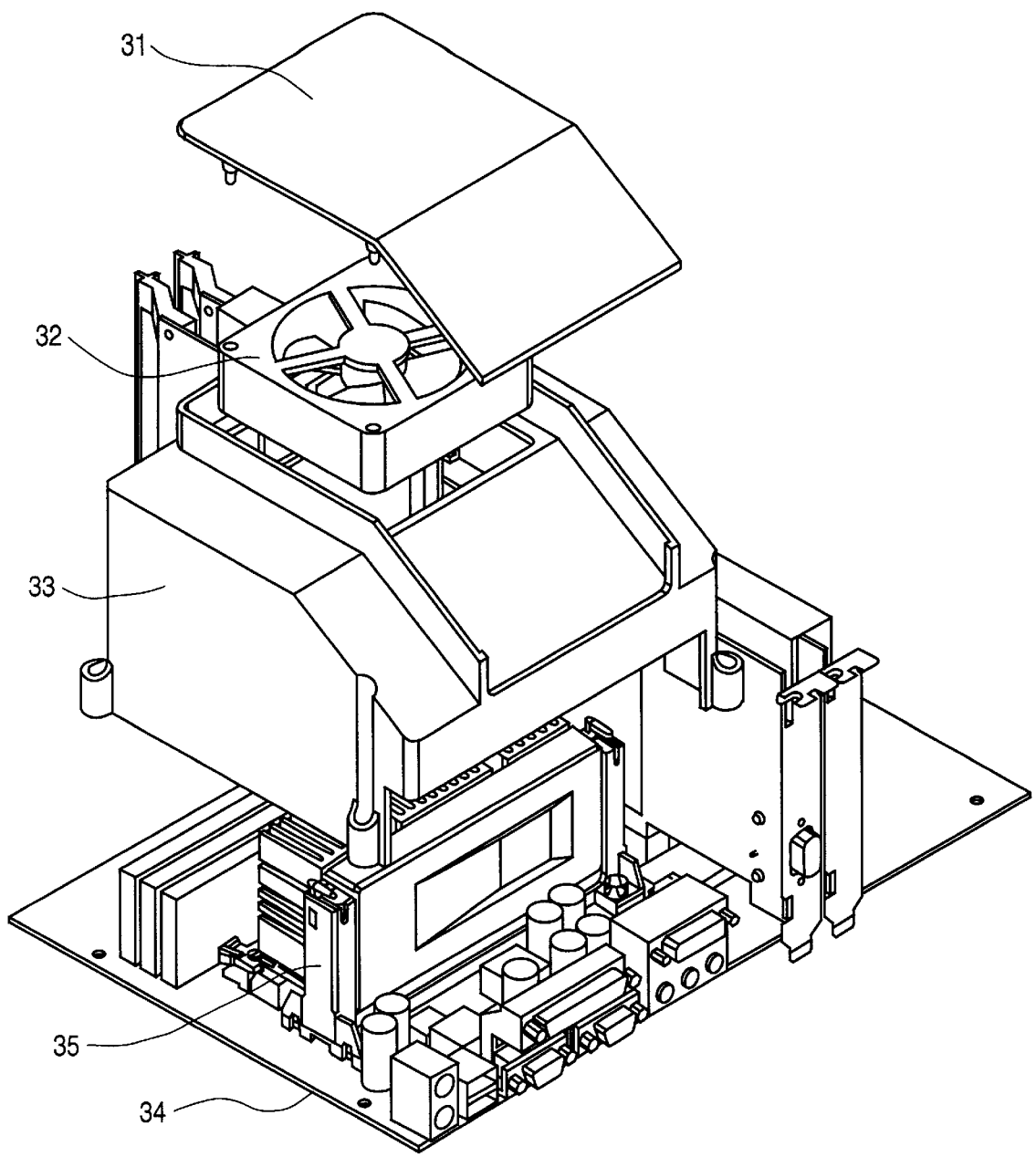
FIG. 3 illustrates the modularity and flexibility of the present invention.

Moreover, as shown in FIG. 3, air-guiding duct 31, fan 32, base 33 and system board 34 are modular components. Thus, each of these mentioned parts can be manufactured independently. Additionally, system board 34 uses a standard CPU retainer 35. The advantages of using standardized parts or ordinary parts produced by multiple manufacturers are: low cost and ample availability for consumers. Further, if computer systems are indeed built with standardized or off-the-shelf common parts instead of proprietary and inflexible ones, manufacturers may be motivated or even forced to focus on their specialties and develop the most cost effective fans, bases, system boards, air ducts, and so on in order to remain competitive in the marketplace. The end result will ultimately benefit consumers, because the quality of produced goods will be better and the prices will be lower.

Having mentioned one embodiment of the present invention, it should be appreciated that the positioning of air-guiding duct 3 l and fan 32 may vary as long as the coupling of them delivers fresh, unheated air directly from the outside of computer system directly to the components on the computer system boards. The sizes and shapes of air-guiding duct 31 and fan 32 will vary depending upon the particular cooling requirements of the enclosure components.

FIG. 4 illustrates another embodiment of the present invention. Enclosure 40 is formed by fastening the modular cooling apparatus 41/42 to the base retention module 43. Base retention module 43 contains the system board and houses all the core electronic components such as memory 44 and the processor. It should however be appreciated that system board can extend beyond base 43. As shown in this embodiment, fan 42 is installed inside of air-guiding duct 41. Air-guiding duct 41 provides an air path or channel from the outside of enclosure 40 directly to the input side of the fan 42 and to the inside of the enclosure through air input opening 45. Fan 42 is angled slightly inside of air-guiding duct 41 to deliver fresh ambient air substantially perpendicularly towards all the core electronic components that are affixed on base retention module 43. It should be again noted that this air is not pre-heated prior to reaching all the devices on base retention module 43. After cool air has passed over the components on base retention module 43, the air is heated by all those heat-generating devices. The heated air exits enclosure 40 by following the arrows in FIG. 4 through exhaust opening 46. Although the exhausting air is heated, it is at high velocity and can be used to cool additional electronic components.

Additionally, FIG. 5 demonstrates the modularity of modular cooling apparatus 41/42 and base retention module 43. Similar to the first described embodiment, each module can be built separately. Using the same reasoning in the first embodiment, consumers again will benefit from such an arrangement.

Even though fan 42 resides within the air-guiding duct 41 in the foregoing description, it should be understood that fan 42 does not need to be situated inside air-guiding duct 41. The first embodiment clearly demonstrates one alternative where such a requirement is not necessary. Further, the exact angling of fan 42 within air-guiding duct 41 will depend on the location of components that are affixed on base retention module 43. No particular angle is required or implied in the present invention as the coupling of fan 42 and air-guiding duct 41 delivers fresh, unheated air from the outside of computer system directly to the components on base retention module 43 in a substantially perpendicular direction relative to the plane of the circuit boards. Lastly, the exhaust opening 46 for exhausting heated air from enclosure 40 to the outside of enclosure 40 can be positioned anywhere that would efficiently serve its function and aid in additional cooling of other components.

Thus, an improved modular cooling mechanism for a computer system enclosure has been described. Although the present invention has been described particularly with reference to the figures, it will be apparent to one of ordinary skill in the art that the present invention may appear in any of a number of other modular cooling system configurations using a fan, an air-guiding duct and either a base covering system components or a base retention module. It is contemplated that many changes and modifications may be made by one of ordinary skill in the art without departing from the spirit and scope of the present invention.

What is claimed is:

1. A cooling apparatus comprising:
   a. a modular fan with a rectangular casing;
   b. a modular air-guiding duct detachably coupled to said rectangular casing of said fan, said air-guiding duct including a first input opening to receive fresh air, said air-guiding duct including an enclosed channel to guide said fresh air from said first input opening to an input side of said fan; and
   c. a modular base with a second input opening, wherein the perimeter of said second input opening is at least the perimeter of said rectangular casing of said fan, to detachably couple said rectangular casing of said fan and said air-guiding duct over electronic components on a computer system circuit board in an orientation where said fan delivers said fresh air through said second input opening directly and unrestrictedly to said electronic components in a substantially perpendicular direction.

2. The apparatus according to claim 1, wherein said fan is coupled inside of said air-guiding duct.

3. The apparatus according to claim 1, wherein said base also acts as a retention module which holds said computer system circuit board.

4. The apparatus according to claim 3, wherein said fan is coupled inside of said air-guiding duct.

5. A cooling apparatus comprising:
   a. a modular fan with a rectangular casing;
   b. a modular air-guiding duct detachably coupled to said rectangular casing of said fan, said air-guiding duct including a first input opening to receive fresh air, said air-guiding duct including an enclosed channel to guide said fresh air from said first input opening to said input side of said fan;
   c. a modular base with a second input opening, wherein the perimeter of said second input opening is at least the perimeter of said rectangular casing of said fan, to detachably couple said rectangular casing of said fan and said air-guiding duct over electronic components on a computer system circuit board; and
   d. means for delivering fresh air from said fan through said second input opening directly and unrestrictedly to said electronic components in a substantially perpendicular direction.

6. The apparatus according to claim 5, wherein said fan is coupled inside of said air-guiding duct.

7. In a computer system containing a processor and a power supply, a cooling apparatus comprising:
   a. a modular fan with a rectangular casing;
   b. a modular air-guiding duct detachably coupled to said rectangular casing of said fan, said air-guiding duct including a first input opening to receive fresh air, said air-guiding duct including an enclosed channel to guide said fresh air from said first input opening to an input side of said fan; and
   c. a modular base with a second input opening, wherein the perimeter of said second input opening is at least the perimeter of said rectangular casing of said fan, to detachably couple said rectangular casing of said fan and said air-guiding duct over electronic components on a computer system circuit board in an orientation where said fan delivers said fresh air through said second input opening directly and unrestrictedly to said electronic components in a substantially perpendicular direction.

8. The apparatus according to claim 7, wherein said fan is coupled inside of said air-guiding duct.

9. The apparatus according to claim 7, wherein said base also acts as a retention module which holds said computer system circuit board.

10. The apparatus according to claim 9, wherein said fan is coupled inside of said air-guiding duct.

* * * * *

UNITED STATES PATENT AND TRADEMARK OFFICE
CERTIFICATE OF CORRECTION

PATENT NO. : 6,130,819
DATED : October 10, 2000
INVENTOR(S) : Lofland et al.

Page 1 of 1

It is certified that error appears in the above-identified patent and that said Letters Patent is hereby corrected as shown below:

<u>Column 4,</u>
Line 3, delete "3 land" and replace with -- 31 and --.

Signed and Sealed this

Twenty-sixth Day of March, 2002

*Attest:*

*Attesting Officer*

JAMES E. ROGAN
*Director of the United States Patent and Trademark Office*